United States Patent

Tickle

[15] 3,660,827

[45] May 2, 1972

[54] BISTABLE ELECTRICAL CIRCUIT WITH NON-VOLATILE STORAGE CAPABILITY

[72] Inventor: Andrew C. Tickle, Chatsworth, Calif.

[73] Assignee: Litton Systems, Inc., Beverly Hills, Calif.

[22] Filed: Sept. 10, 1969

[21] Appl. No.: 856,607

[52] U.S. Cl. ..........................340/173 FF, 307/238, 307/279

[51] Int. Cl. ..........................G11c 11/40

[58] Field of Search ..........................307/238, 279; 340/173 FF; 317/235

[56] References Cited

UNITED STATES PATENTS

| | | | |
|---|---|---|---|
| 3,549,911 | 12/1970 | Scott | 307/279 |
| 3,387,286 | 6/1968 | Dennard | 340/173 |
| 3,447,137 | 5/1969 | Fever | 340/173 |
| 3,541,531 | 11/1970 | Iwersen | 340/173 |

*Primary Examiner*—Terrell W. Fears
*Attorney*—Alan C. Rose, Alfred B. Levine, Ronald W. Reagin and Lawrence V. Link, Jr.

[57] ABSTRACT

A bistable electrical circuit, such as a flip-flop, incorporating insulated-gate field-effect transistors as non-volatile memory elements. Read and write circuitry couple the memory elements to amplifying (switching) stages of the bistable circuit such that the state of the flip-flop, at the time a write signal is applied to the memory elements, is nonvolatilely stored. Upon application of a read signal the flip-flop is initialized to a state which is a function of the state of the flip-flop during the writing mode of operation. Data storage is maintained in the absence of all applied power to the bistable electrical circuit.

23 Claims, 9 Drawing Figures

INVENTORS
ANDREW C. TICKLE

BY

Lawrence V. Link Jr
ATTORNEY

INVENTORS
ANDREW C. TICKLE

BY

Lawrence V. Link Jr.
ATTORNEY

INVENTORS
ANDREW C. TICKLE
BY
Lawrence V. Link Jr.
ATTORNEY

BISTABLE ELECTRICAL CIRCUIT WITH NON-VOLATILE STORAGE CAPABILITY

CROSS-REFERENCES TO RELATED APPLICATIONS

This application is related to U. S. Pat. application Ser. No. 856,575, filed Sept. 10, 1969 entitled, "Metal-Nitride-Semiconductor Memory" by William L. Paterson and Andrew C. Tickle; and U. S. Pat. application Ser. No. 866,058, filed Sept. 10, 1969 "Direct Storage Non-Volatile Bistable Circuit" by John G. Mark and Andrew C. Tickle. All of the just referenced applications were filed on the same date as the subject application.

BACKGROUND OF THE INVENTION

This invention relates generally to bistable electrical circuits with nonvolatile storage, and particularly to a flip-flop circuit that may be initialized to a state which is dependent on the state of the flip-flop at the time of application of a previously applied write signal.

Bistable electrical circuits, such as the flip-flop, are commonly used as binary information storage devices in data systems. These devices have the advantage that their electrical state may be changed rapidly by a small input of electrical energy and they are active devices yielding a large power gain. The advent of large scale integration of microminiature semiconductor devices made flip-flops particularly attractive as data storage devices, and flip-flop circuits constructed from field-effect transistors have the additional advantages of low power consumption.

Prior art flip-flop circuits have a serious disadvantage in that continuous power is required while data is being stored and an interruption in the power supply causes loss of the stored data. Further, if prior art flip-flop circuits are utilized as basic building blocks of digital counters and registers, each stage of the counter or register must be initialized each time prime power is interrupted.

Heretofore, the most commonly used media for nonvolatile storage, (i.e. data storage over an extended period of time without the consumption of power) have been mechanical or magnetic devices. Mechanical means such as punch cards and papered tapes are extremely cheap but are slow, bulky and nonerasable. Magnetic tapes, drums and discs are considerably faster, although their sequential mode of access makes their effective speed too slow for many applications. Also, the reliability of magnetic tapes, drums and discs is less than fully electronic systems. Memory systems using ferrite cores and magnetic films provide reliable, high speed, nonvolatile storage of data, but have a number of disadvantages such as high power consumption and stringent requirements on the driving electronics. Various ferroelectric materials, whose polarization exhibits hysteresis characteristics analogous to that of ferromagnetic materials, have been investigated in the search for a nonvolatile storage media which avoids the disadvantages of magnetic systems. However, no ferroelectric material has been found to date which can be reliably used as a nonvolatile storage media.

SUMMARY OF THE INVENTION

In accordance with one preferred embodiment of the subject invention separate gating circuits are coupled to each of the amplyifying stages of a bistable circuit, such as a flip-flop circuit having first and second stable states. Each gating circuit includes a semiconductor-insulator device that responds to write signals of a first amplitude and polarity so as to vary the conduction characteristics of the semiconductor-insulator device as a function of the state of the flip-flop circuit at the time of application of the write signal. In response to read signals, the gating circuits produce asymmetrical current loading of the amplifying stages of the flip-flop such that the flip-flop is initialized to a state which is dependent upon its state when the write signal was applied to the gating circuits. The binary information is non-volatilely stored by the semiconductor-insulator devices, but may be erased by application of an erase pulse to their gates. The writing and erasing operation does not effect the normal logic mode of operation of the flip-flop, and in accordance with the subject invention the erase, read and write cycle may be accomplished in a matter of tenths of a microsecond.

The non-volatile storage capabilities of the flip-flop circuit, in accordance with the principles of the subject invention, result from a recently discovered characteristic of certain insulated-gate field-effect transistors, hereinafter referred to as IGFETs. For example, when a layer of silicon nitride is used as the dielectric between the gate electrode and the substrate of an IGFET the threshold voltage, $V_t$, of the resulting metal-nitride-silicon (MNS) insulated-gate field-effect transistor may be shifted many volts by the application of a sufficiently large electric field of a first polarity across the silicon-nitride dielectric layer. This shift in threshold voltage has been found to be quasi-permanent, and recovery under zero applied field occurs with a time constant of the order of months or years. The application of a sufficiently large electric field of a second polarity restores the threshold voltage to its initial value in time periods of a few hundred nanoseconds.

The mechanism by which the threshold voltage may be shifted in the MNS IGFET is believed to be the tunneling of charge across the semiconductor-insulator interface. Because of the energy barrier at the interface, the probability of charge tunneling across it is extremely small under conditions of zero applied field, even through appropriate states may exist in the insulator. When a large electric field is applied across the insulator the probability of tunneling to and from states in the insulator close to the interface is increased my many orders of magnitude. When charge is removed from the semiconductors and stored in the insulator in this manner, the shift in the threshold voltage, $V_t$, is a function of the amount of charge stored at the semiconductor insulator interface. In flip-flop circuits according to the principles of the subject invention, the just described shift in threshold voltage, $V_6$, of the MNS transistors is utilized by coupling one of MNS transistors to each of the amplifying (switching) stages of a bistable circuit such that the threshold voltage of only one of the MNS transistors will be substantially shifted upon the application of a write signal. The determination of which MNS transistor will experience a shift in threshold voltage is a function of the state of the flip-flop at the time of application of the write voltage. Upon application of a read signal the varying threshold levels of the different MNS devices result in asymmetrical current loading of the bistable circuit such that the circuit switches to a state determined by its state upon the previous application of the write signal.

Flip-flop circuits which have non-volatile storage capability and which may be initialized either to the state during writing or to the complement of the state of the flip-flop at the time the data was stored, have numerous applications in data storage units and computer arithmetic units.

In applications utilizing complementary restoring flip-flop circuits, in accordance with one embodiment of the invention, as basic elements of registers and counters, if it is desired to initialize the register or counter at the same state that existed upon the previous application of a write signal, this may be readily accomplished by applying a sequence of read-write-read signals to all stages of the counter or register in sequence. Since the read-write cycles of the subject flip-flops require only a very small time interval, direct storage of the binary state may be accomplished in this manner, if desired, without a significant time penalty.

It is therefore an object of the subject invention to provide a bistable electrical circuit capable of nonvolatile storage of binary information.

Another object of the invention is to provide a bistable electrical circuit capable of nonvolatile storage of binary information and of being selectively initialized to either the direct or the complementary state of the circuit at the time the binary information was stored.

Still another object is to provide a bistable electrical circuit capable of performing normal binary information storage in a logic mode of operation and of storing a selected one of two binary states in the absence of applied power.

A further object of the invention is to provide an improved flip-flop circuit which may be set to either one of two stable states in a normal logic mode of operation; which responds to a write signal to permanently store one of the two states; and which responds to a read signal to initialize the flip-flop circuit to the complement of the selected state.

A still further object is to provide a bistable electrical circuit capable of performing normal binary logic storage and which, after an interruption of applied power, may be set to a state dependent on the state it was set in during application of a write signal prior to the power interruption.

BRIEF DESCRIPTION OF THE DRAWINGS

The novel features which are believed to be characteristic of the invention, both as to its organization and method of construction and operation, together with further objects and advantages thereof will be better understood from the following description taken in conjunction with the accompanying drawings in which the illustrative embodiments of the invention are disclosed. It is to be expressly understood, however, that the drawings are for the purpose of illustration and description only and do not define limitations of the invention.

In the drawings.

DESCRIPTION OF THE PREFERRED EMBODIMENTS

Figure 1:
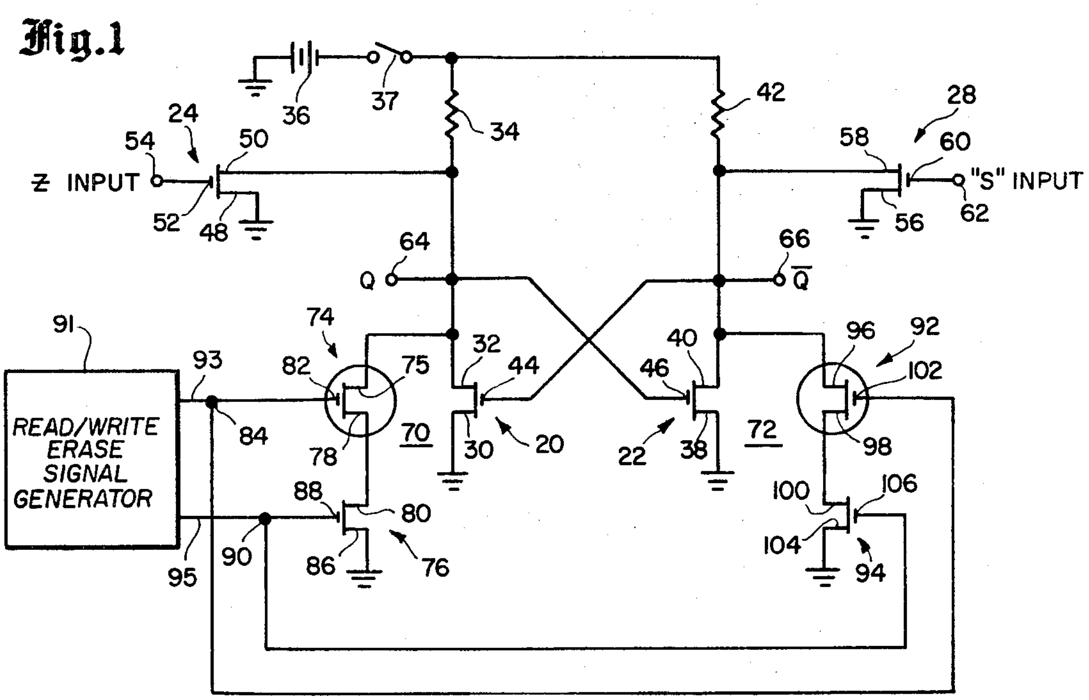
FIG. 1 is a schematic and block diagram of a complementary restoring flip-flop with nonvolatile storage capabilities according to the principles of the subject invention.

Referring now to the drawings, one preferred embodiment of a complementary restoring flip-flop circuit having non-volatile storage capabilities, shown in FIG. 1, will first be described. An understanding of the unique features of this circuit will provide a basis for the subsequent explanation of the more sophisticated direct or complementary restoring flip-flop circuit of FIG. 9.

Referring now primarily to FIG. 1, the basic flip-flop circuit includes signal translating devices 20, 22, 24 and 28 which devices may be metal-oxide-silicon insulated-gate field-effect transistors, hereinafter referred to as MOS IGFETs. In the embodiment shown in FIG. 1, the MOS IGFETs are P channel on N substrate types. However, it will be understood that the particular type of signal translating devices comprising the basic flip-flop circuit are not critical to the subject invention and any suitable signal translating device may be utilized. Further, the particular configuration of the basic flip-flop circuit is not limiting of the subject invention. The particular basic flip-flop circuit illustrated in FIG. 1 is a rudimentary circuit selected by way of illustration so that the subject invention may be more clearly explained. It will be understood, however, that the subject invention is not limited to the particular basic flip-flop circuit incorporated therein, but may be readily adapted to any bistable electrical circuit.

The transistor 20 has a source terminal 30 coupled to ground and a drain terminal 32 coupled through a resistor 34 and a switch 37 to a source of direct current (DC) potential 36. The transistor 22 has a source terminal 38 connected to ground, and a drain terminal 40 coupled through a resistor 42 and the switch 37 to the source of DC potential 36. A gate terminal 44 of the transistor 20 is connected to the drain terminal 40 to the transistor 22; and a gate terminal 46 of the transistor 22 is connected to the drain terminal 32 of the transistor 20.

The transistor 24 has a source terminal 48 connected to ground, a drain 50 connected to the drain terminal 32 of the transistor 20 and a gate terminal 52 connected to a "Z" input terminal 54. The transistor 28 has a source terminal 56 connected to ground, a drain terminal 58 coupled to the collector terminal 40 of the transistor 22 and a gate terminal 60 coupled to a "S" input terminal 62.

Transistor 20 and 22 form inverting amplifiers cross-coupled in a regenerative switching arrangement. The portion of the flip-flop circuit comprising the transistors 20 and 22 has two stable states, "Zero" and "Set." In the "Set" state the transistor 20 is cut off (nonconducting) and the transistor 22 is conducting at or near its saturation level. Therefore, in the "Set" state the signal Q at an output terminal 64 is substantially at the potential of the source of potential 36, which potential may be considered a binary 1. In the "Set" state the complementary output signal $\bar{Q}$ at an output terminal 66 is substantially at ground potential, which potential may be considered a binary 0. Conversely, in the 0 state the transistor 22 is substantially cut off and transistor 20 is conducting at or near its saturation level. In the 0 state the signal Q at the terminal 64 represents a binary 0, and the signal $\bar{Q}$ at the terminal 66 represents a binary 1.

In the embodiment shown in FIG. 1, a ground potential applied to the gate electrode of the conducting transistor initiates the reversal of conductive states. A ground potential may be applied to the gate terminals of transistors 20 or 22 by applying a low level negative triggering pulse to the gate terminals of transistors 28 or 24 respectively. If for example, the flip-flop circuit is in the "Set" state and a negative triggering pulse is applied to the "Z" input terminal 54, the transistor 24 applies a momentary ground potential to the gate terminal 46 of the transistor 22. In response to the ground potential applied to gate terminal 46, the transistor 22 starts to turn off (i.e. conduction is reduced) causing the potential at the drain 40 to increase in a negative direction which results in the transistor 20 being turned on (i.e. starts to conduct). Once the state reversal has been initiated by the input switching pulse, the flip-flop configuration is such that the reversal of conductive states continues without any further input signal.

To return to the "Set" state a low level negative signal is applied to the "S" input terminal 62 of the transistor 28. In response to this signal the transistor 28 applies a momentary ground potential to the gate terminal 44 of the transistor 20 thereby reversing the conductive state of the transistors 20 and 22 in a manner similar to, but opposite from, that just described for initiating the 0 state.

Non-volatile storage capability is incorporated into the flip-flop circuit of FIG. 1 by gating circuits indicated generally by reference numerals 70 and 72.

Gating circuit 70 includes a metal-nitride-silicon insulated-gate field-effect transistor 74 and a metal-oxide-silicon insulated-gate field-effect transistor 76. MNS IGFET 74 has a drain terminal 75 connected to the drain terminal 32 of the transistor 20 and a source terminal 78 connected to a drain terminal 80 of the transistor 76. A gate terminal 82 of the transistor 74 is connected to a write/read/erase input terminal 84. The transistor 76 has a source terminal 86 connected to ground and a gate terminal 88 connected to a reset input terminal 90.

The gating circuit 72 includes a metal-nitride-silicon insulated-gate field-effect transistor 92 and a metal-oxide-silicon insulated-gate field-effect transistor 94 connected in a configuration similar to that of the gating circuit 70. The transistor 92 has a drain terminal 96 coupled to the drain terminal 40 of the transistor 22, a source terminal 98 coupled to a drain terminal 100 of the transistor 94, and a gate terminal 102 connected to the write/read/erase input terminal 84. The transistor 94 has a source terminal 104 connected to ground, and gate terminal 106 coupled to the reset input terminal 90.

Input terminals 84 and 90 are connected to a read/write/erase signal generator 91 by leads 93 and 95 respectively. The signal generator 91 may be any conventional signal source for producing the signals shown in FIG. 8 and described hereinafter.

The substrates of transistors 20, 22, 24, 28, 74, 76, 92 and 94 may all be connected to ground.

The operation of the flip-flop circuit of FIG. 1 may be better understood by first examining some of the characteristics of a metal-nitride-silicon insulated-gate field-effect transistor, such as the transistors 74 and 92 of the gating circuits 70 and 72, respectively. The construction of a typical metal-nitride-silicon insulated-gate field-effect transistor is shown in the cross-sectional view of FIG. 2. The basic structure of the device of FIG. 2 comprises P+ type regions or channels 112 and 114 formed into an N type silicon substrate 110. A silicon-nitride film 116 is formed over the surface of the substrate 110, leaving openings for a metallic drain electrode 118 to contact the P+ type region 112 and for a source electrode 120 to contact the P+ type region 114. The silicon-nitride film 116 is covered with a silicon-dioxide sheeting 122 leaving openings for the electrodes 118 and 120 and for a gate electrode 124 which contacts the silicon-nitride film 116. In one MNS device suitable for utilization in the circuits of the subject invention, and adapted for a large scale integration, the silicon-nitride film 116 may be in the order of 700 to 1,400 angstroms thick, and the gap between the source and drain regions 114 and 112 respectively, may be on the order of 10 microns.

The following method has been successfully utilized in producing MNS IGFETs suitable for the subject invention. However, it is understood that the invention is not limited to the devices produced by this method, but encompasses all semiconductor-insulator devices, regardless of how manufactured, within the scope and spirit of the claims.

The substrate 100 may be phosphorous doped silicon which is prepared by lapping, etching, polishing, etching, and is alkali cleaned followed by a deionized water wash. The P+ regions or channels 112 and 114 are formed by conventional boron diffusion (diborine) using a thermally grown oxide as a mask. Next the oxide diffusion mask is dissolved in buffered hydrofluoric acid and the silicon surface is then water washed, soap scrubbed, water washed, alkaline cleaned, washed in deionized water and dried in nitrogen.

The cleaned wafers are next placed on a quartz surface (carbon block) in an RF induction furnace and subjected to an RF discharge cleaning for approximately 7 minutes at about 200° Centigrade. Silicon nitride film 111 is deposited by the ammoniation of silane at 900° Centigrade with the following flow rates: $SiH_4$ at 8 $cm^3$/min, $NH_3$ at 850 $cm^3$/min, and deposition of $Si_3N_4$ occurs at approximately 100 to 2,000 angstroms/min.

The silicon dioxide sheeting 122 is also performed in an RF furnace by oxidation of silane. For the deposit of the silicon dioxide the flow rates are: $O_2$ at 80 $cm^3$/min, $SiH_4$ at 8.0 $cm^3$/min, $N_2$ to 10 liter/min. Initial temperature during this step is 700° Centigrade and nucleation begins almost immediately when the $SiH_4$ is started. The wafer temperature is then lowered to 400° Centigrade and approximately 7,000 angstroms of $SiO_2$ is deposited at 500 angstroms/min.

Next, the op layer of $SiO_2$ is etched by standard procedures to form a mask for the etching of the underlying $Si_3N_4$. The $Si_3N_4$ is etched in a concentrated reagent grade phosphoric acid at 180° Centigrade. Then the $SiO_2$ mask is dissolved and the mask is dissolved and the metal electrodes 118, 120 and 124 attached by standard procedures.

It is noted that if the just described MNS devices have been handled under atmospheric conditions, a minute layer of silicon-oxide may be formed between the substrate 110 and the silicon-nitride film 116. This oxide layer may be removed by heating the substrate 110 in a vacuum or reduced atmosphere and it has been noted that this minute layer of silicon-oxide may enhance the desired controllably threshold voltage shift of the MNS devices.

As explained previously the threshold voltage, $V_t$, of a field-effect transistor is the potential difference which must be applied between the gate and the source electrodes to cause the onset of substantial current conduction between the drain and the source electrodes. While the threshold voltage of a metal-oxide-silicon semiconductor transistor is substantially constant, it has been recently discovered that when silicon-nitride is used as the dielectric between the gate electrode and the substrate instead of silicon dioxide, the threshold voltage may be shifted by many volts by the application of a sufficiently large electric field across the dielectric film. This shift in the threshold voltage, $V_t$, which occurs in metal-nitride-silicon transistors, is semipermanent in the absence of a second applied electric field, and recovery occurs with a time constant on the order of months or years. The application of an electric field of sufficient magnitude and of a second predetermined polarity across the dielectric layer of the MNS devices acts to restore the threshold voltage to its initial value in a time of a few hundred nanoseconds.

Figure 2:
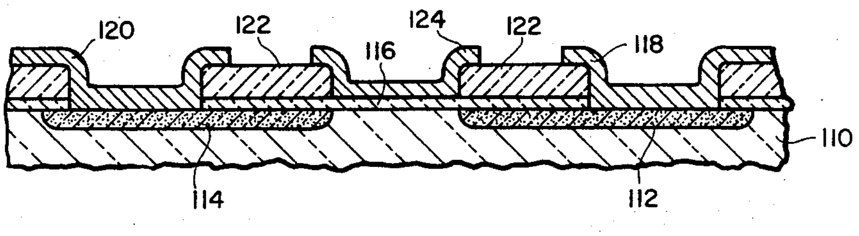
FIG. 2 is a cross sectional view of a metal-nitride-silicon insulated-gate field-effect transistor that may be utilized in the bistable electrical circuits of the subject invention.
Figure 3:
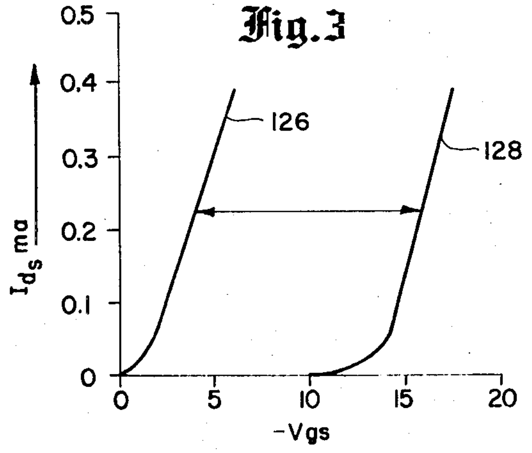
FIG. 3 is a graph of drain current vs. the voltage between the gate and source elements of a metal-nitride-silicon transistor, for explaining the nonvolatile data storage capability of the transistor.

FIG. 3 shows the transfer characteristics of a MNS semiconductor-insulator device after electric fields of first and second magnitudes and polarities have been applied across the silicon-nitride dielectric film 116 (FIG. 2). The ordinate in the graph of FIG. 3 ($I_{ds}$) is the current flowing between the source and drain terminals and the abscissa ($V_{gs}$) is the voltage applied between the gate and source terminals of the MNS device. Curves 126 and 128 could represent, for example, the transfer characteristics of one particular MNS device after potential of a +40 voltage and a −30 voltage, respectively, have been applied across the dielectric film 116. After the application of the positive potential, the threshold voltage, $V_t$, is a least negative voltage and after the application of the negative potential the threshold, $V_t$, is shifted to a more negative value. For the particular MNS device associated with the transfer characteristics of FIG. 3, and for the potentials stated above, the transfer characteristics are shifted approximately 12 volts in the negative direction upon the application of a large negative potential across the dielectric film.

Figure 4:
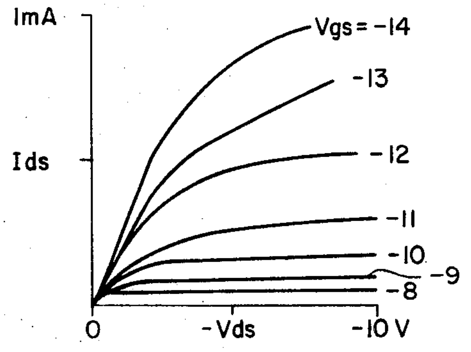
FIGS. 4 and 5 are graphs of drain current vs. the voltage between the drain and source elements of a metal-nitride-silicon transistor for further explanation of the storage capability of the transistor.
Figure 5:
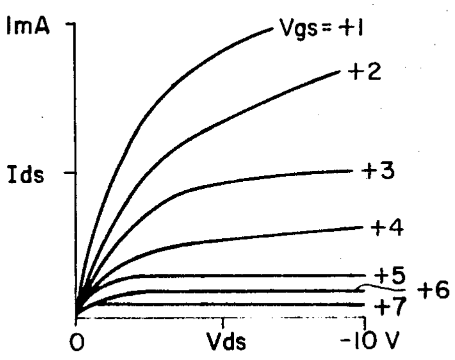

FIGS. 4 and 5 are graphs of the current flow between the drain and source electrodes of an MNS device plotted against the voltage between the drain and source electrodes ($V_{ds}$) for different values of potential applied between the gate and source electrodes ($V_{ds}$). In FIG. 4 a negative potential, for example a negative 30 volts, has been initially applied across the dielectric film resulting in a threshold voltage, $V_t$, of a negative 8 volts. In FIG. 5 a positive potential of 40 volts, for example, had initially been applied across the dielectric film resulting in a threshold voltage, $V_t$, of +4 volts. The shape of the characteristic curves as shown in FIG. 4 and 5 are independent of the value of the threshold voltage, $V_t$, and thus the effect of applying the strong positive and negative fields across the dielectric layer 111 is characterized completely by specifying the value of the threshold voltage, $V_t$.

Operation of the complementary restoring flip-flop circuit having non-volatile storage capabilities, shown in FIG. 1, is initiated by closing switch 37 so as to apply prime power to the circuit. The potential of the DC power source 36 may be a negative 20 volts, for example.

In a first logic mode of operation signal generator 91 applies a ground potential to the terminals 84 and 90, causing the transistors 74, 76, 92 and 94 to be cut off (i.e. nonconductive). Consequently, the gating circuits 70 and 72 have no effect on the operation of the remaining portions of the flip-flop circuit of FIG. 1. In this logic mode of operation, the flip-flop functions in a conventional manner in response to triggering signals applied to the "S" input terminal 62 and to the "Z" input terminal 54. For example, referring to the waveforms of FIG. 8, if at time $T_1$ the flip-flop circuit of FIG. 1 was initially in the "Set" position, a signal Q, at the output terminal 64, would be a binary 1 (indicated by a negative potential level) as shown in waveform 130. Upon application of a negative triggering pulse 134 (waveform $V_z$) at time $T_2$ to the "Z" input terminal 54, the flip-flop circuit is switched to the 0 state and the output signal Q switches to a binary 0 (substantially ground potential). Upon application of a negative triggering pulse 136, of waveform 138 ($V_s$), at time $T_4$ the flip-flop circuit is returned to the "Set" state and the signal Q to the binary 1 potential level. The signal $\bar{Q}$ is shown by a waveform 140 as the complementary signal to the signal Q depicted in waveform 130.

Figure 8:
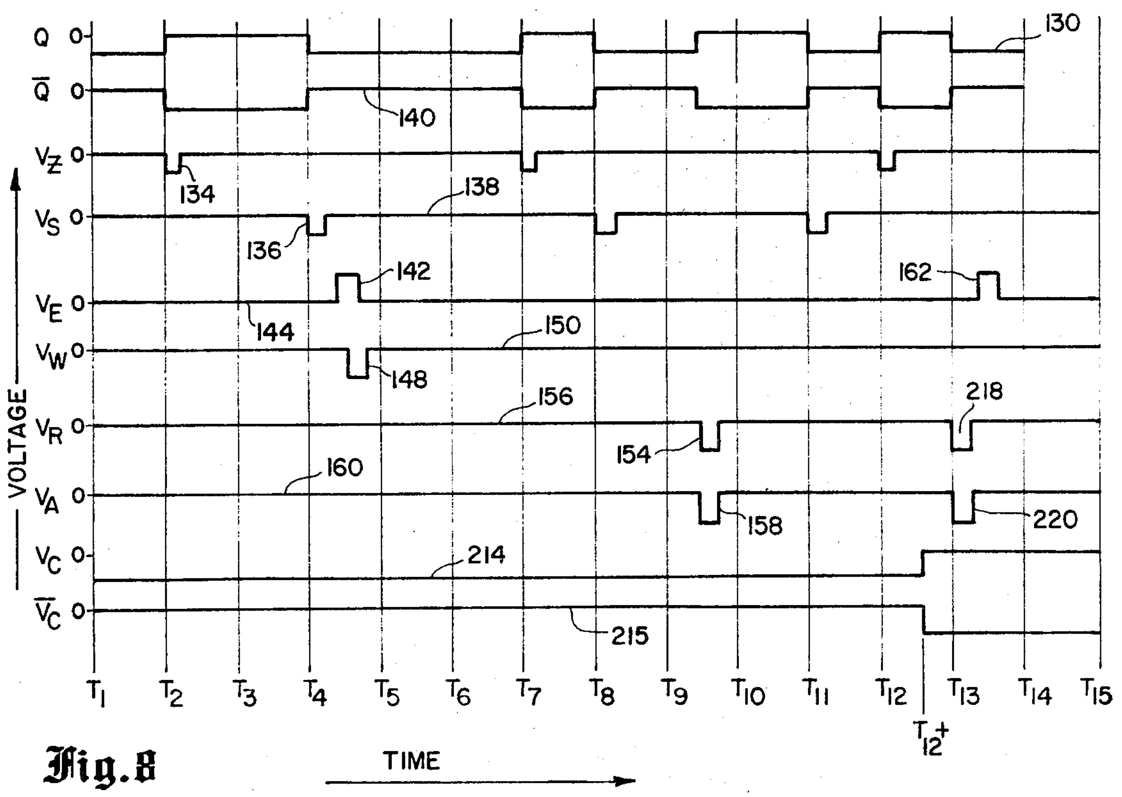
FIG. 8 is a graph of voltage amplitude vs. time for explaining the operation of the bistable electrical circuits with non-volatile storage of the invention.

To initiate the storage mode of operation the MNS transistors 74 and 92 are first set to the threshold condition depicted by the waveform 126 of FIG. 3. In this clear or erase mode of operation a large positive pulse, for example, of a magnitude of a +40 volts, is applied to the input terminal 84 from the signal generator 91. One such erase pulse 142 of waveform 144 ($V_E$) is shown in FIG. 8 as being applied between time periods $T_4$ and $T_5$. It is noted that the operation of erasing the transistors 74 and 92 has no effect upon the state of the flip-flop circuit of FIG. 1 as shown by the output signals Q and $\bar{Q}$, waveforms 130 and 140 respectively of FIG. 8.

Figure 6:
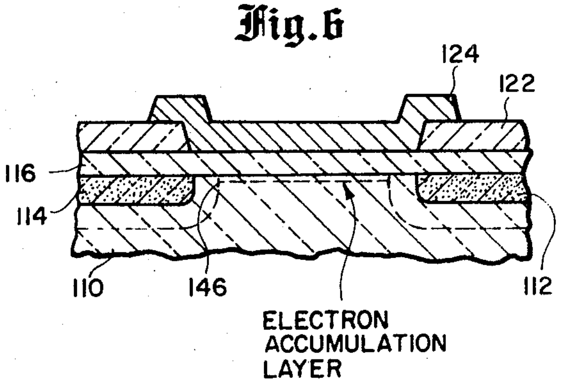
FIGS. 6 and 7 are cross-sectional views of a metal-nitride-silicon transistor for explaining the various modes of operation of the transistor.

The effect of applying the erase pulse 142 to the gate electrodes of the MNS IGFET is illustrated in the cross-sectional view of FIG. 6, wherein an electron accumulation layer 146 is shown as formed at the interface surface between the substrate 110 and the dielectric or insulator film 116. The applied field causes the threshold value, $V_t$, to shift to a less negative value.

Figure 7:
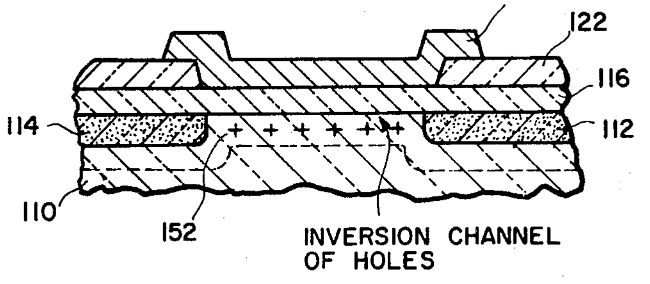

In the write mode of operation a negative pulse such as pulse 148 of waveform 150 ($V_w$) is applied to the input terminal 84 from the signal generator 91. In response to this negative potential applied to the gate electrodes of the MNS IGFET devices an inversion channel of holes, such as channel 152 of FIG. 7 is formed between the source element 114 and the drain element 112 of the transistor. It is important to note that due to the inversion channel of holes 152 that the potential of the substrate at the interface between the substrate 110 and the dielectric layer 116 is a function of the potential applied to the drain electrodes of the MNS devices.

For the situation depicted in FIG. 8, at the time of the application of the write pulse 148, the drain electrode of the transistor 74 is substantially at the potential of the DC source 36, for example, a negative 20 volts. This is due to the fact that at the time of the application of the write pulse 148 the flip-flop circuit was in the "Set" condition as indicated by the signal Q of the waveform 130. By the same token, the potential of the drain electrode 96 of the transistor 92 is substantially at ground potential at the time of application of write pulse 148 because the transistor 22 is conducting at or near the saturation level. Therefore, if the potential of the write pulse 148 were a negative 30 volts, for example, there would be only a negative 10 volts appearing across the dielectric layer of the transistor 74. This is because the drain terminal 75 of this transistor was at a negative 20 volts and the inversion layer directly beneath the dielectric 116 couples the dielectric-substrate interface to the same electrical potential as the drain terminal. However, since the drain terminal 96 of the transistor 92 is substantially at ground potential there will be approximately a negative 30 volts applied across the dielectric film 116 of the transistor 92. As explained previously, it is a characteristic of insulated-gate field-effect transistors having silicon-nitride as a dielectric to experience a shift in threshold voltage, $V_t$, upon the application of a large negative potential across the dielectric film. However, the shift in threshold voltage does not occur if the negative potential is below a selected value. For the devices herein illustrated, a negative 10 volts applied across the dielectric film does not produce a significant shift in the threshold value; whereas a negative potential in the order of a negative 30 volts will effect the shift in the threshold voltage as illustrated by the separation between the curves 126 and 128 of FIG. 3. Also, it should be noted that although the application of the write pulse 148 of the waveform 150 effects a change in the characteristics of the silicon-nitride devices 74 or 92, that the application of a write pulse does not effect the state of the basic flip-flop circuit. The flip-flop circuit cannot change states because the gates comprising transistors 76 and 94 are nonconductive due to the ground potential applied to the terminal 90. After termination of the write pulse the information representing the state of the flip-flop at the time of the application of the write signal 148 is permanently stored in silicon nitride devices 74 and 92 and the state of these transistors 74 and 92, which represents the information stored, remains constant until a subsequent erase cycle initiated by signal generator 91 and is independent of subsequent states of the flip-flop circuit and of the absence of applied prime power.

When it is desired to set the flip-flop circuit to a complementary state to that existing at the time of the application of the write pulse 148, a negative pulse such as pulse 154 of the waveform 156 ($V_R$) is applied to the terminal 84, and a negative pulse such as the pulse 158 shown in waveform 160 ($V_A$) is simultaneously applied to the input terminal 90. The pulse 158, applied to the input terminal 90, switches the transistors 76 and 94 into a conductive state and the source electrodes of the MNS devices 74 and 92 are effectively placed at ground potential.

The next pulse, such as the pulse 154, is preferably of an amplitude between the threshold values, $V_t$, of the two states of the MNS FET devices. For example, referring to FIG. 3, the amplitude of the read pulse 154 could be selected at approximately a negative 8 volts so that the MNS device having a transfer characteristic represented by the curve 126 would be conducting heavily while the MNS device, having a transfer characteristic represented by the curve 128, would be essentially nonconducting. In any event one of the MNS transistors will conduct more than the other so as to unbalance the basic flip- flop sufficiently to produce the desired complementary state.

Therefore, in response to the read pulse 154 applied to the terminal 84, the transistor 74 would be conducting heavily resulting in essentially a ground potential being applied to the gate terminal of the transistor 22 causing that transistor to cease conduction. On the other hand, the read pulse applied to the transistor 92 would not be of sufficient magnitude to switch that transistor into conduction due to the more negative threshold value imparted to the transistor 92 during the write period. As the drain electrode 40 of the transistor 22 rises in a negative direction towards the potential of the source 36, the gate 44 of the transistor 20 acts to turn on the transistor 20 therefore causing the circuit on FIG. 1 to assume a state which is the complement of the state it was in at the time of the application of the write pulse 148.

After the signals applied to terminals 84 and 90 return to ground potential, the gating circuits 70 and 72 cease to interact with the other portions of the flip-flop circuit of FIG. 1 and normal logic operation of that circuit may be resumed. Also, it should be noted that at any time prior to the application of the next erase pulse, such as erase pulse 162 of waveform 144, the circuit may be returned to the complement of the state it was in at the time of the application of the last write pulse by simultaneously applying negative pulses to the terminals 84 and 90.

Figure 9:
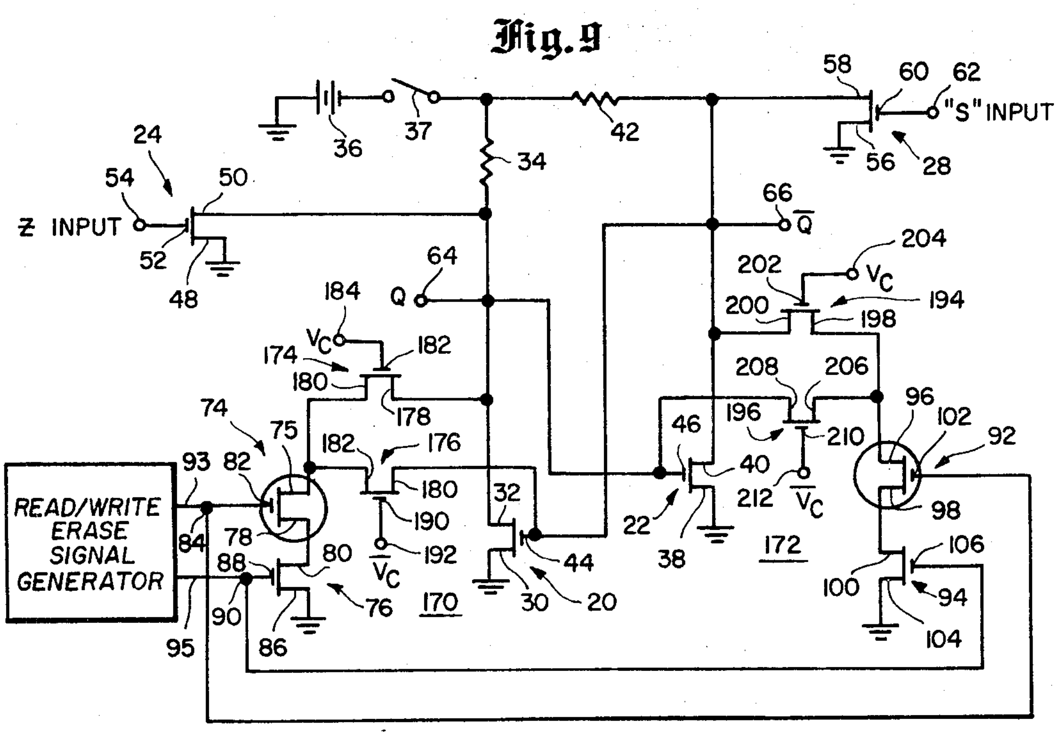
FIG. 9 is a schematic and block diagram of a direct or complementary restoring flip-flop with non-volatile storage according to the subject invention.

The direct or complementary restoring flip-flop circuit of FIG. 9 is similar in structure to the complementary restoring flip-flop circuit of FIG. 1. In the nonvolatile bistable electrical circuit of FIG. 9 parts which directly correspond to those of FIG. 1 have been assigned like reference numerals so that it will be sufficient to discuss the additional components which provide the increased capabilities of the circuit of FIG. 9.

In the circuit of FIG. 9 control switching circuits, indicated generally by reference numerals 170 and 172, are coupled in series to the gating circuits 70 and 72 respectively. In other respects the circuit of FIG. 9 is identical to that of FIG. 1 described previously.

Control switching circuit 170 comprises signal translating devices 174 and 176 which devices may be MOS IGFETs. Transistor 174 has a drain electrode 178 coupled to drain electrode 32 of the transistor 20; a source electrode 180 connected to the drain electrode 75 of MNS IGFET 74; and a gate electrode 182 connected to a signal input terminal 184. Transistor 176 has a drain electrode 186 connected to the gate electrode 44 of transistor 20; a source electrode 182 connected to drain electrode 75 of MNS IGFET 74, and a gate electrode 190 connected to a signal input terminal 192.

Control switching circuit 172 comprises signal translating devices 194 and 196 which also may be MOS IGFETs. Transistor 194 has a drain electrode 198 connected to drain electrode 96 of MNS IGFET 92; a source electrode 200 connected to drain electrode 40 of transistor 22; and a gate electrode 202 connected to a signal input terminal 204. Transistor 196 has a drain electrode 206 connected to drain electrode 96 of MNS IGFET 92; a source electrode 208 connected to the gate electrode 46 of transistor 22; and a gate electrode 210 connected to a signal input terminal 212. The substrates of the transistors 174, 176, 194 and 196 may all be connected to ground.

In the operation of the circuit of FIG. 9, control signal $V_c$, is applied to input terminals 184 and 204; and a complementary signal $\overline{V}_c$ is applied to input terminals 192 and 212. Signal input terminal 184 may be connected directly to signal input terminal 204, and terminal 192 to terminal 196. These connections are not shown in FIG. 9 in the interest of maintaining maximum clarity of the drawings. The amplitudes of the signal $V_c$ and $\overline{V}_c$ are such that either transistors 174 and 194 are conducting and transistors 176 and 196 are cut off; or transistors 176 and 196 are conducting and transistors 174 and 194 are cut off.

Reference is now directed to the waveforms 214 and 215 of FIG. 8, which depict signals $V_c$ and $\overline{V}_c$ respectively. Between the time periods $T_1$ and $T_{12}^+$ the signals $V_c$ and $\overline{V}_c$ are such that the gating stages 70 and 72 are coupled to the remaining portions of the flip-flop circuit in exactly the same configuration as shown in FIG. 1, and the circuit of FIG. 9 will perform as a complementary restoring bistable electrical circuit as explained previously relative to FIG. 1.

However, after the time $T_{12}^+$ the signal $V_c$ and $\overline{V}_c$ are reversed in polarity resulting in the gating circuits 70 and 72 being coupled to different amplifying switching stages (20,22) of the basic flip-flop circuit. Therefore, if after the time period $V_{12}^+$ read and reset pulses, such as pulses 218 and 220 respectively, are applied to the terminals 84 and 90 respectively, the circuit of FIG. 9 will be set to the same state as it was in when the last write pulse had been applied.

In general, it may be seen that if the same stages (e.g. transistors 174 or 176) of controlled switching circuits 170 and 172 are conducting during the application of a write signal ($V_w$) and during the subsequent application of a read signal ($V_R$) then the circuit of FIG. 9 will restore to the complementary state of that held at the time of the application of the write signal. However, if the stages of the control switching circuits 170 and 172 are switched between the application of the write signal and the read signal, then the circuit of FIG. 9 will restore to the same state it held at the time of application of the last preceding write signal.

Thus there has been described a novel and unique bistable electrical circuit which is capable of nonvolatilely storing binary data and of being initialized to either a direct or complementary binary state of the state it held at the time of the application of a previous write pulse. It is noted that in the embodiments described herein that the memory elements have been described in terms of MNS IGFETs. However, it will be understood that any semiconductor-insulator device which exhibits the characteristics shown in FIG. 3 may be utilized in accordance with the principles of the subject invention. Also, the circuits described herein, in the interest of simplicity, have been discussed as comprising discrete components. However, it will be understood by those skilled in the art, that one of the primary advantages of the bistable electrical circuit of the subject invention is that they are readily adaptable to microelectronics and integrated circuit techniques. For example, resistors 34 and 42 may be formed from MOS IGFETs, with the gate electrodes connected to the drain electrodes, so that all of the components may be formed on a single chip or substrate. Still further, the transistors discussed herein have been illustrated as devices comprising P channels in N substrates. However, it will be apparent to those skilled in the art that N channels on P substrate devices could be utilized in accordance with the principles of the subject invention with the proper reversal of the polarity of supply voltages and input signals.

It is understood that the above described arrangements are illustrative of the application of the principles of the invention. Numerous other arrangements may be devised by those skilled in the art without departing from the spirit and scope of the invention.

What is claimed is:

1. An information storage device comprising:
   a bistable electrical circuit;
   gating means including at least one nonvolatile semiconductor memory device which can assume at least a first and a second stable, nonvolatile state;
   input means for applying read and write signals to said gating means, and
   means for connecting said gating means to said bistable circuit to place said memory device in a state dependent upon the state of said bistable circuit at the time of application of said write signal, and to place said bistable circuit in a state dependent upon the state of said memory device at the time of application of said read signal.

2. The device of claim 1 wherein said semiconductor memory device includes a field-effect transistor having a gate electrode and a substrate with a dielectric material, disposed between the gate electrode and the substrate which exhibits nonvolatile memory characteristics in response to electric fields applied across said dielectric material, whereby upon application of a read signal of a predetermined magnitude to said gate electrode, said transistor presents an impedance to said bistable circuit which is a function of the electric field applied across said dielectric material at the time of application of the last preceding write signal.

3. The device of claim 2 wherein said gating means includes means for setting said bistable circuit, upon application of a read signal, to a state which is the complement of the state of said bistable circuit at the time of application of the last preceding write signal.

4. The device of claim 2 wherein said gating means includes means for setting said bistable circuit, upon application of a read signal, to the same state as the state of said bistable circuit at the time of application of the last preceding write signal.

5. The device of claim 2 further comprising control means connected between said gating means and said bistable circuit, for selectively controlling the coupling of said gating means to said bistable circuit; whereby upon application of a read signal said bistable circuit is set to either the same state or the complement of the state it was in at a time of application of the last preceding write signal.

6. The device of claim 2 wherein said dielectric material is a layer of silicon-nitride.

7. The device of claim 1 wherein:
   said bistable circuit includes first and second amplifying devices interconnected such that said circuit exhibits, in operation, first and second stable states;
   said gating means includes first and second gating circuits coupled to said first and second amplifying devices respectively;

each of said gating circuit includes a nonvolatile semiconductor memory which can assume either a first or a second stable, nonvolatile state.

8. The device of claim 7 wherein said first and second amplifying devices each have a control element, an input element and an output element; and said first and second gating circuits are coupled between the input element and the output element of said first and second amplifying devices respectively; whereby in response to the application of said read signals, said bistable circuit is set to the complement of the state of the bistable circuit at the time of the last previously applied write signal.

9. The device of claim 7 wherein said first and second amplifying devices each have a control element, an input element and an output element; and said first and second gating circuits are coupled between the input element and the control element of said first and second amplifying devices respectively; whereby in response to the application of said ready signals, said bistable circuit is set to the same state as the state of said bistable circuit at the time of the last previously applied write signal.

10. The device of claim 8 wherein each of said nonvolatile semiconductor memory devices has a control element, an input element and an output element; and said first and second gating circuits each includes a switching device having a control element, an input element and an output element.

11. The device of claim 10 wherein : said input and output elements of said nonvolatile semiconductor memory devices and said switching devices, in each of said first and second gating circuits, are coupled in series across said input and output elements of different ones of said first and second amplifying devices; said input means has first and second input circuits; said control element of each of said nonvolatile semiconductor memory devices is coupled to said first input circuits; and said gate element of each said switching device is coupled to said second input circuit.

12. The device of claim 9 wherein:

said semiconductor memory devices each have a control element, an input element and an output element;

said first and second gating circuits each includes a switching device having a control element, an input element and an output element;

said input and output elements of said semiconductor memory devices and of said switching devices, in each of said first and second gating circuits, are coupled in series across said input and control elements of different ones of said first and second amplifying devices;

said input means has first and second input circuits;

said control element of each of said semiconductor memory devices is coupled to said first input circuit; and said gating element of each said switching device is coupled to said second input circuit.

13. The device of claim 13 wherein each of said semiconductor memory devices is an insulated-gate field-effect transistor including a substrate and a gate element which is said control element with a dielectric material disposed between the gate element and the substrate which exhibits nonvolatile memory characteristics in response to electric fields applied across said dielectric, whereby upon application of a read signal of a predetermined amplitude to said gate electrode, said transistor presents an impedance which is a function of the electric field applied across said dielectric material at the time of application of the last preceding write signal.

14. The device of claim 13 wherein said dielectric material is a layer of silicon-nitride.

15. The device of claim 7 wherein each of said semiconductor memory devices is a field-effect transistor having a substrate, gate, drain and source elements, with a dielectric material disposed between the gate element and the substrate.

16. The device of claim 15 wherein said dielectric material is a layer of silicon-nitride and said semiconductor-insulator device exhibits nonvolatile memory characteristics in response to a write signal of a first amplitude applied across said dielectric, and erase characteristics in response to an erase signal of a second amplitude applied across said dielectric.

17. The device of claim 1 wherein:

said bistable circuit includes first and second amplifying devices interconnected in a regenerative arrangement such that said circuit has first and second stable states, said amplifying devices each having a control element, an input element and an output element;

said gating means includes first and second gating circuits, each said gating circuit comprising a nonvolatile semiconductor memory device and a switching device, with each of said semiconductor memory devices and each of said switching devices having an input element, an output element and a control element;

said input and output elements of said semiconductor memory device and said switching device in each of said first and second gating circuits are coupled in series;

the output element of each of said semiconductor device is coupled to an output element of a different one of said amplifying devices; and said input means includes first and second input circuits coupled to the control elements of said semiconductor memory devices and to said switching devices respectively.

18. The device of claim 17 wherein said semiconductor-insulator devices are insulated-gate field-effect transistors.

19. The device of claim 18 wherein said control element of each said insulated gate field-effect transistor is a gate electrode; each transistor has a substrate; and a dielectric layer, exhibiting nonvolatile memory characteristics, is disposed between said gate electrode and said substrate of each transistor.

20. The device of claim 19 wherein said dielectric layer comprises a film of silicon-nitride.

21. The device of claim 20 wherein said switching devices and said amplifying devices each comprise a metal oxide silicon field-effect transistor, and the control element of each amplifying device is coupled to the output element of the other amplifying device.

22. A device according to claim 1 wherein:

said bistable circuit includes first and second amplifying devices interconnected in a regenerative arrangement such that said circuit has first and second states, said amplifying devices each having a control element, an input element and an output element;

said gating means includes first and second gating circuits, and control means for selectively coupling said first and second gating circuits to said first and second amplifying devices respectively;

each of said first and second gating circuit comprises a nonvolatile semiconductor memory device and a switching device with said semiconductor memory devices and said switching devices each having an input element, an output element and a control element;

said input and output elements of said semiconductor memory device and said switching device, in each of said first and second gating circuits, are coupled in series;

the output element of each of said semiconductor memory devices is selectively coupled through said control means to either the output element or the control element of a different one of said amplifying devices; and said input means includes first and second input circuits coupled to the control elements of said semiconductor memory devices and to said switching devices respectively;

thereby forming a complementary restoring flip-flop circuit or a directly restoring flip-flop circuit depending on whether the coupling of said gating circuits through said control means is to the output element or to the control element respectively, of said amplifying devices.

23. The device of claim 22 wherein said semiconductor memory devices are insulated-gate field-effect transistors with each said transistor having a control element, a substrate, and a dielectric layer disposed between said substrate and said control elements which exhibits nonvolatile memory characteristics in response to electric fields applied across said dielectric layer.

* * * * *